Patented Feb. 14, 1933

1,897,242

UNITED STATES PATENT OFFICE

GEORGE DEFREN, OF NEWTON, MASSACHUSETTS

PROCESS OF PREPARING CHOCOLATE

No Drawing.    Application filed April 11, 1930. Serial No. 443,629.

This invention relates to improvements in the manufacture of chocolate.

Cocoa, or cacao, beans occur in commerce mainly as whole beans. They may be considered as composed of three parts: shells, "nibs,"—or the meaty portion of the bean—, and the germs.

According to the present practice of making chocolate, raw cacao beans are roasted for a sufficient period of time to develop their flavor. Incidentally, roasting the beans also removes some of the moisture and some of the volatile acids that are naturally inherent in the beans as they appear in commerce. After roasting the beans, they are cracked and "fanned" which loosens and separates the shells from the nibs and germs. The germs are difficult to grind and are considered undesirable; and they are separated from the nibs by a suitable device.

The nibs of the beans contain about 50% to 55% cocoa butter which butter melts at approximately 32° C. The nibs are ground between burr stones, or grooved, revolving discs, until the required degree of fineness has been attained. Grinding evolves heat, which heat melts the cocoa butter, the quantity of which is sufficient to make the reddish brown fluid mass which is called "chocolate liquor" or simply "liquor". The liquor is mixed with a solid sweetening or modifying agent, as sugar, generally sucrose, commonly called granulated sugar, or sometimes dextrose, lævulose, zylose, milk sugar, powdered dried milk, or other carbohydrates, etc., and ground until the sugar crystals, or the other solids, are sufficiently comminuted, or disintegrated. In some factories, the sugar is ground separately, the finest particles being removed from the coarser ones by air flotation, or screens. The finely divided sugar is then added to the desired quantity of liquor to produce a palatable article. Any needed cocoa butter is generally added at this stage of manufacture. This sweetened liquor is called "chocolate" or "coating" since a large proportion of the chocolate so made is used for the coating of confections.

Fine grinding of the liquor and the sugar are considered desirable features in a good coating. Much expensive machinery, power, and supervision are utilized to attain a smooth tasting piece of goods, free from grit. Most coatings on the market are ground to pass at least a one hundred mesh sieve. When 90% of the solid particles will pass a two hundred mesh sieve, the coating is considered very good. The tongue seems incapable of distinguishing any grit when the coating will pass a three hundred mesh sieve.

It has been the practice in the finer qualities of coatings to treat them further in machines called "conches" for from one to one hundred or more hours. Conching appears to eliminate some of the volatile acids and other substances which have disagreeable, harsh odors and flavors, which were not entirely removed in the roasting of the beans. Conching also appears to disintegrate some of the sugar and cocoa mass.

My process for making coatings differs radically from any other process heretofore employed as I eliminate the roasting of the raw bean, if desired; do not grind any sugar, etc.; and I accomplish the effect of conching with simple equipment, producing a fine quality of coating at a much lower cost.

In accordance with my process I form a chocolate liquor from ray cacao beans by grinding the shell-free nibs in more or less the usual manner and by the usual or suitable apparatus. Preferably, although not essentially, the raw beans, prior to grinding, are given an initial treatment to remove some of the acrid and bitter soluble constituents of the bean and to loosen the adherency of the shell to the kernel by soaking the beans in water that is a solvent for the undesired constituents and also for the mucilaginous adhesive which binds the shell to the kernel. The beans are allowed to soak for a period of time which by experience is found satisfactory to loosen the shells and remove enough of the undesired constituents to obtain a desired characteristic of the finished product. It is considered unnecessary to describe the soaking process in further detail as the process and the advantages thereof are set forth fully in my Patent No. 1,750,795, dated March 18, 1930.

The beans are then allowed to dry, or are dried, thoroughly and then are ground in the above-described manner to produce chocolate liquor.

A sweetening or modifying agent is then added to the liquor. Whereas, heretofore, it has been the practice to add such agent, as sugar, in a solid state to the liquor, in accordance with my present method I add the agent as a liquid, from which the solvent is subsequently removed, with the result that the remaining solid matter is in a very fine state of division, so that a smooth coating is produced without the extensive grinding and conching processes heretofore found necessary.

To this end, the finely ground liquor, to which any necessary cocoa butter may be added, is heated to any suitable degree, say to about 90° C. to 100° C. and then is mixed with the desired amount of liquid modifying agent as, for instance, sugar syrup at, say, about 110° C. The mixture is then spray-dried by subjecting it quickly to the action of a blast of air or inert gas, preferably hot, in a more or less usual manner.

The resulting mixture or coating is then treated to develop its flavor, by maintaining it at elevated temperatures, say, at 130° C. to 100° C. for a period of time, say fifteen minutes to two hours or more, or until a desired flavor is attained. It is then cooled quickly to storage temperatures and maintained cool until needed.

I have found it desirable, in treating the mixture to develop its flavor, to maintain the coating in constant agitation by suitable stirring devices which are also capable of closely scraping the coating from the retaining walls, if at elevated temperatures, preferably accompanied by a stream of air bubbling therethrough, to prevent overheating, burning or over-caramelizing any of the coating at the sides of the heating vessel, and to eliminate any moisture which may not have been removed when the coating was sprayed. This heat treatment may be carried out in any convenient apparatus, either as a batch or a continuous process.

The process, as outlined, produces a coating milder in flavor, and smoother in texture than one made from equal materials by present methods.

A coating possessing a fine caramel-like flavor may be obtained by this process, if desired, by suitable time and temperature control of the final heating step of the process.

The hot chocolate liquor, when brought into contact with the hot water in the sugar solution has a tendency to become thick, like a heavy emulsion, very quickly. It is therefore desirable to spray the mixture as rapidly as possible, preferably before the mixture has had an opportunity to become thick.

The difference in temperature between the sugar solution, in the instance mentioned, at 110° C. and the liquor at 90° C., causes supersaturation of the sugar solution when the sugar solution and liquor are mixed due to the drop of about 10° C. The sugar starts to crystallize immediately in microscopic crystals which is further enhanced by presence of the minute particles of cocoa mass in the liquor, by the quick volatilization of the water present due to the latent heat of crystallization, and the further action of the blast of air in the act of spray drying which practically eliminates all of the moisture from the sugar and the liquor, now combined to form a coating.

The production of fine crystals and the elimination of excess moisture may also be accomplished by passing the mixture modifying solution and the coating between heated rolls, discs, or similar devices, but I prefer, however, the spray drying method.

I have found that equally good results may be obtained by utilizing an alcoholic or other solution of the sugar or other carbohydrate, in conjunction with the liquor, in the process substantially as outlined.

I have found that equally good results may be obtained by utilizing higher or lower temperatures for the liquor and sugar syrup as well as the coating produced therefrom, as stated, and do not limit this application to the example indicated.

I have also found that dextrose hydrate or dextrose anhydride can be utilized to advantage in my process, replacing all or part of the sucrose. Dextrose hydrate possesses the property of melting at comparatively low temperatures in its own water of crystallization. This, when sprayed with the chocolate liquor, as described, at any convenient temperature above its melting point, quickly reverts to the crystalline form of dextrose hydrate, or even dextrose anhydride if insufficient water remain to combine with all of the dextrose to form dextrose hydrate.

I have found that a coating made as described using dextrose hydrate in conjunction with chocolate liquor has a lower viscosity than a coating made with a like weight of other sugar due to the presence of less free moisture. Such a coating seems to require a less percentage of cocoa butter for equal purposes.

I have found that a solution of a mixture of carbohydrates, such as sucrose and dextrose, or sucrose and invert sugar when mixed with the chocolate liquor, and subjected to spray drying, for instance, gives as good results as was the case in which a syrup of commercial granulated sugar was utilized as described.

Any mixture of carbohydrates, such as an acid converted starch product, consisting of various percentages of dextrine, maltose, and dextrose, as at present understood, likewise gives good results when spray dried with chocolate liquor, and heat treated as indicated.

The method of heat treating, as outlines, produces aromatic flavors, etc., formerly obtained in the method of roasting beans, in which temperature and time of roasting are functions. Being fluid, or semi-fluid, every particle of the mass is brought into intimate contact with the heating elements, the whole mass assuming uniform temperature and moisture conditions. Such uniformity is impossible in the present method of roasting beans, where the surface of a bean is necessarily subjected to different heat conditions than, for instance, the center of the bean. My process, as outlined, eliminates entirely the necessity of roasting beans as at present understood and practised.

It will be appreciated that the determination of the desired flavor is left to the judgment of the operator, skilled in the art, in the same manner as now applies to the process of roasting cacao beans.

I have found that sugar, or other carbohydrate, in the presence of undetermined constituents of chocolate liquor, produces agreeable flavors at elevated temperatures as indicated. This production of agreeable flavors becomes more noticeable as the percentage of moisture is lessened; and is hastened at an elevation of temperature.

Such agreeable flavors are not produced to as pronounced a degree when heating chocolate liquor alone under like temperature and moisture conditions, if the sugar, or other carbohydrate, or modifying agent, be absent.

I have also found it feasible to spray-dry a solution of sugar, or other carbohydrate, or mixtures thereof, separately from the chocolate liquor, obtaining by this means finely divided material which can be mixed subsequently with the desired amount of chocolate liquor made from nibs obtained from raw, unroasted, cacao beans, keeping said mixture in a fluid state, and heat treating it at elevated temperatures so as to obtain a good coating. But this method of procedure is neither as simple nor as satisfactory as my preferred process outlined above.

Finely ground sugar, or other modifying material, obtained by any other process, may be utilized instead of the spray dried sugar referred to in the immediately preceding paragraph with similar results.

While I prefer to perform my process by making a chocolate liquor from raw, or unroasted, beans, a smooth coating can be made by the use of a liquor made from roasted beans in the usual manner by adding the modifying agent, in a solution, to the liquor. Then the final heat treatment of the coating, after the evaporation of the solvent, need only be carried out for a few minutes, or omitted entirely, if the flavor of the coating be sufficiently developed. The same is true if the liquor be prepared from raw beans which have been soaked in the manner previously described.

Quick crystallization of the sugar, other carbohydrate, or other modifying material in solution, by lowering the temperature, or by spray drying, or by both methods combined, produces desirable microscopic crystals. Slow crystallization on the other hand produces macroscopic crystals, which are undesirable for my purpose. Should any macroscopic crystals form, due to some error or inequality of manufacture or procedure, such macroscopic particles may be disintegrated in any well known manner, without detriment to the process as outlined. I prefer, however, to have operations proceed so that microscopic particles only are produced.

The process as outlined above eliminates the expensive methods of grinding sugar, etc. heretofore employed.

Quick crystallization of the sugar, other carbohydrate, or other modifying material in solution, in conjunction with the spray drying produces a cloud of vapor which removes by volatilization the undesired volatile constituents inherent in the nibs and the liquor made therefrom. These volatile constituents have heretofore been removed more or less in the processes of roasting the cacao beans and in the conching of the coating.

It is obvious that this process is much simpler and far less expensive than conching as now practiced.

The process as outlined above by removing more moisture than is the present practice produces a coating of desirably greater fluidity, and hence of lower viscosity, than one of equal cocoa butter content made from roasted beans and ground sugar in the usual manner.

I am aware that finely divided sugar has been made heretofore by quick crystallization of supersaturated sugar solutions.

I am also aware that chocolate coating has been sprayed but the spraying was done at comparatively low temperatures to produce chocolate in finely divided form, such as small hard pellets.

I am aware that coating made from roasted cacao beans has been heat treated.

I claim:

1. The process of making chocolate which comprises preparing a chocolate liquor, mixing intimately therewith a solution of a solid modifying agent in a solvent, and removing the solvent from the mixture so rapidly that the solution of the solid modifying agent becomes supersaturated and the solid modifying agent is caused to exist mainly as microscopic particles which are dispersed intimately throughout the chocolate.

2. The process of making chocolate which consists in preparing a chocolate liquor, mixing therewith a solution of a solid modifying agent in a solvent, and removing the solvent so rapidly from the mixture by spray-drying the mixture that the solution of the solid modifying agent becomes supersaturated and the solid modifying agent is caused to exist mainly as microscopic particles which are dispersed throughout the chocolate.

3. The process of making chocolate which consists in preparing a chocolate liquor, mixing therewith a sugar syrup, and then immediately removing the liquid from the mixture before the mixture thickens and so rapidly that the sugar syrup becomes supersaturated and causes the sugar to exist mainly as microscopic crystals which are dispersed throughout the chocolate.

4. The process of making chocolate which consists in preparing a chocolate liquor from raw unroasted cacao beans, mixing therewith a sugar syrup, spray-drying the mixture to remove liquid from the mixture and to form the sugar mainly into microscopic crystals which are dispersed throughout the chocolate liquor, and subsequently heat-treating the mixture to develop the flavor thereof.

5. The process as defined in claim 4 wherein air is forced through the mixture during the heat-treating thereof.

6. The process of making chocolate which consists in preparing a chocolate liquor from raw unroasted cacao beans from which a substantial part of the soluble acrid and bitter constituents have been removed, mixing a solution of a solid modifying agent with the liquor, and removing the solvent from the mixture.

7. The process as defined in claim 6 which includes the step of heat-treating the solvent free mixture to develop the flavor thereof.

In tesimony whereof, I have signed my name to this specification.

GEORGE DEFREN.